United States Patent [19]

Levien

[11] Patent Number: 5,055,942
[45] Date of Patent: Oct. 8, 1991

[54] PHOTOGRAPHIC IMAGE REPRODUCTION DEVICE USING DIGITAL HALFTONING TO SCREEN IMAGES ALLOWING ADJUSTABLE COARSENESS

[76] Inventor: Raphael L. Levien, Rte. 1, Box 18, McDowell, Va. 24458

[21] Appl. No.: 476,060

[22] Filed: Feb. 6, 1990

[51] Int. Cl.⁵ .......................... H04N 1/23; H04N 1/40
[52] U.S. Cl. ..................... 358/456; 358/459; 358/298
[58] Field of Search .......... 358/459, 456, 298

[56] References Cited

U.S. PATENT DOCUMENTS

| | | |
|---|---|---|
| 498,127 | 5/1893 | Levy . |
| 1,790,722 | 2/1931 | Ranger . |
| 4,012,584 | 3/1977 | Gascoigne ........................ 358/302 |
| 4,561,025 | 12/1985 | Tsuzuki ........................... 358/459 X |
| 4,574,357 | 3/1986 | Pastor et al. ..................... 354/518 |
| 4,651,287 | 3/1987 | Tsao ............................... 358/459 X |
| 4,654,721 | 3/1987 | Goertzel .......................... 358/459 |
| 4,680,645 | 7/1987 | Dispoto ........................... 358/459 X |
| 4,707,745 | 11/1987 | Sakano ............................ 358/456 |
| 4,841,374 | 6/1989 | Kotani ............................. 358/458 |
| 4,901,363 | 2/1990 | Toyokawa ....................... 358/261.2 X |
| 4,933,776 | 6/1990 | Ikeda .............................. 358/456 |
| 4,956,718 | 9/1990 | Numakura ........................ 358/456 X |

OTHER PUBLICATIONS

An Adaptive Algorithm for Spatial Greyscale, Robert W. Floyd et al., Floyd and Steinberg/An Adaptive Algorithm for Spatial Greyscale, pp. 75-77.
Digital Halftoning, Robert Ulichney, The MIT Press, Cambridge, Mass., London, England-Error Diffusion with Perturbation, pp. 279-283.

Primary Examiner—Benjamin R. Fuller
Assistant Examiner—Eric Frahm
Attorney, Agent, or Firm—Allan J. Jacobson

[57] ABSTRACT

In the generation of screened halftones of photographic images for low resolution marking devices, conventional screen techniques are too coarse, and adaptive dither techniques are too fine. The present invention preserves the advantages of the adaptive dither techniques, while creating screen patterns with an adjustable degree of coarseness. The invention applies a hysteresis constant and recursion techniques previously limited to adaptive screening with fixed dot patterns to vary the size of dots in the screened image, thereby allowing adjustment of the image coarseness by adjusting the hysteresis constant.

26 Claims, 6 Drawing Sheets

SEQUENCER MODULE (64) OUTPUTS

| PHASE | ADDRESS | PULSES A | B | C | D | E |
|---|---|---|---|---|---|---|
| 1 | 0 | * | | | | |
| 1 | 1 | * | | | | |
| ... | | | | | | |
| 1 | N-1 | * | | | | |
| 2 | 0 | | * | | | |
| 2 | 0 | | | * | | |
| 2 | 0 | | | | * | |
| 2 | 1 | | * | | | |
| 2 | 1 | | | * | | |
| 2 | 1 | | | | * | |
| ... | | | | | | |
| 2 | N-1 | | * | | | |
| 2 | N-1 | | | * | | |
| 2 | N-1 | | | | * | |
| 3 | 0 | | | | | * |
| 3 | 1 | | | | | * |
| ... | | | | | | |
| 3 | N-1 | | | | | * |
| 1 | 0 | * | | | | |
| 1 | 1 | * | | | | |
| ... | | | | | | |
| 1 | N-1 | * | | | | |
| 2 | N-1 | | * | | | |
| 2 | N-1 | | | * | | |
| 2 | N-1 | | | | * | |
| 2 | N-2 | | * | | | |
| 2 | N-2 | | | * | | |
| 2 | N-2 | | | | * | |
| ... | | | | | | |
| 2 | 0 | | * | | | |
| 2 | 0 | | | * | | |
| 2 | 0 | | | | * | |
| 3 | 0 | | | | | * |
| 3 | 1 | | | | | * |
| ... | | | | | | |
| 3 | N-1 | | | | | * |

FIG. 7

PHOTOGRAPHIC IMAGE REPRODUCTION DEVICE USING DIGITAL HALFTONING TO SCREEN IMAGES ALLOWING ADJUSTABLE COARSENESS

BACKGROUND OF THE INVENTION

1. Field of the Invention

This invention relates to reproduction of photographic images, and more particularly, to electronically generating a screened image, which at any point can be either black or white, but not an intermediate gray level. Such devices include thermal transfer fax machines, laser electrostatic, and inkjet printers. The invention further relates to adjusting the coarseness of the resulting screened image.

2. Description of the Related Art

A typical electronic device for reproducing photographic images consists of a scanning module, a screening module, and a marking module. The scanning module is used to sense the gray shade of each point of the original photographic image, and report it in electronic form. The screening module processes this data into a form suitable for marking. Because many marking devices can only reproduce black or white at any given point, and not intermediate shades of gray, the screening module must generate a screened image containing only black and white points. Electronic signals representing the screened image are then routed to the marking module, which marks a medium such as paper or photographic film with the black and white points corresponding to the image generated by the screening module.

One technique used in a screening module is electronic simulation of a conventional screening technique. The conventional technique is described in U.S. Pat. No. 498,127, "Screen For Making Photomechanical Printing Plates." A state-of-the art electronic simulation is described in U.S. Pat. No. 4,012,584. This technique simulates gray shades by varying the size of the dots. However, the number and position of the dots remains constant. When used with marking modules exhibiting low spatial resolution, this technique suffers two problems. First, the screen patterns are coarse. Second, the number of shades that can be distinguished is small, also causing degradation in the reproduction quality. Conventional techniques which vary the size of the dots have not employed adaptive or recursive methods.

Conventional screening techniques have been employed with repeated cells of pixels in fixed locations. Often these fixed cells are rotated to enhance the pattern to the viewer. Since fixed cells have a finite number of pixels, it is only possible to obtain a limited number of gray shades. For example, where thirteen pixels are in a cell only thirteen shades of gray are possible. This is because each of the 13 pixels must be either on or off.

Adaptive dither is another technique that can be used in a screening module. With this technique, gray shades are simulated using very small dots. Lighter shades are represented with fewer dots than darker shades. An early example of this technique is given in U.S. Pat. No. 1,790,722 "Duplex photo modulator." Other popular examples are shown in Floyd, R. W., and L. Steinberg, "An Adaptive Algorithm For Spatial Grayscale", Proc. SID, vol. 17/2, pp. 75-77 and Ulichney, R, "Digital Halftoning", pp. 279-283. Adaptive techniques seek to cause an error signal representing the difference between the screened output and the input to approach zero. Typically, adaptive techniques generate a screened image exhibiting a large number of very small uniform size dots.

While the adaptive technique often provides better detail reproduction, less objectionable patterns, and a larger number of distinguishable shades of gray than the conventional screening technique, it has the further disadvantage of generating screen patterns that are too fine to be well reproduced by most marking devices. This problem is especially severe in reproducing gray shades in the 50% gray region.

As discussed above nothing in the state of the art suggests varying the size of dots generated by an adaptive technique.

SUMMARY OF THE INVENTION

In view of the limitations of the above related art, it is an object of the invention to provide a photographic image reproduction device wherein photographic images are reproduced with good reproduction of detail.

Another object of the invention is to provide a photographic reproduction device wherein a large number of gray shades can be distinguished.

Yet another object is to provide a photographic reproduction device wherein the resulting screening patterns appear pleasing to the eye.

A further object of the invention is to provide a photographic reproduction device wherein the resulting screening patterns can be reproduced accurately by common types of marking devices.

It is still another object of the invention to vary the size of dots generated by an adaptive technique in photographic reproduction.

The above objects of the invention are accomplished by a screening method and apparatus which allows the use of recursive or adaptive techniques to vary the size of dots used in producing the image. It should be noted that the dots can be produced by marking (e.g.,black) and not marking (e.g., white) the medium storing the image produced. Any printing, electronic, or other storage medium which can represent an image by stored values is within the scope of the invention. In addition, although black and white dots are contemplated, other color dots can also be used within the scope of the invention. The resulting irregular placement of the dots significantly improves the number of gray shades which can be produced by the marking device. The recursive technique operates in two dimensions and employs a "hysteresis" or adjustable coarseness constant which is used with an error signal to determine the coarseness of the image.

The photographic reproduction device according to the invention has a random access memory (RAM), a scanning device, a screening device which uses the RAM for input, output, and temporary storage of intermediate results, and a marking device. The screening device cycles through three phases of operation. In the first phase, image data from the scanning device is stored in an input area of the RAM. During the second phase, the screening patterns are computed, and stored in an output area of the RAM. During the third phase, the resulting screening patterns stored in the output area of the RAM are output to the marking device. Each of these phases of operation comprises an iteration through the same number of data elements as there are pixels in one scan line. During alternate screening processing phases, the scanning proceeds left-to-right, then right-to-left, to avoid objectionable diagonal line patterns.

It would be known to one of ordinary skill in the art that processing for the screening device can be implemented using a software program running on a general or special purpose computer or can be implemented using special purpose electronic circuitry. Both such implementations would be within the scope of the invention.

BRIEF DESCRIPTION OF THE DRAWINGS

Further details of the present invention are explained with the help of the attached drawings in which:

FIG. 7 is a tabulation of the signals produced by the sequencer module;

DESCRIPTION OF THE PREFERRED EMBODIMENTS

Figure 1:
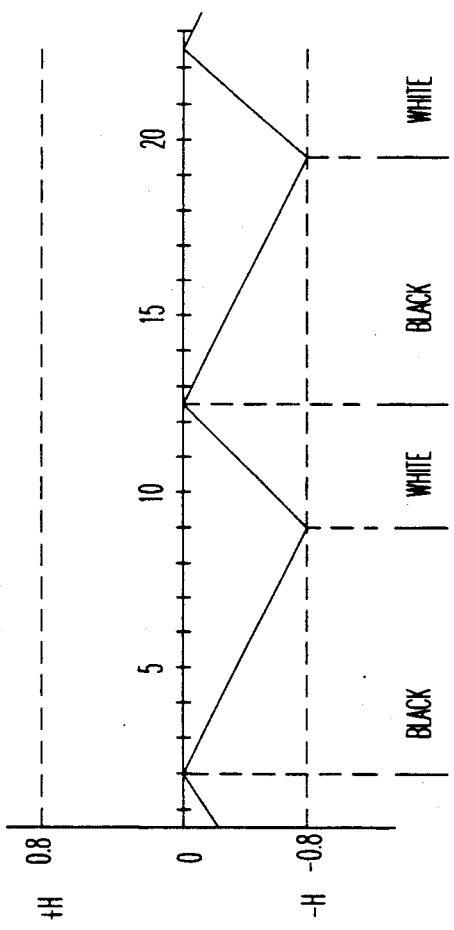
FIG. 1 shows an error curve for a constant gray shade input from a scanner and corresponding black and white outputs.

While the invention applies to a two dimensional (x, y) screening process, for purposes of simplifying its illustration, a one dimensional case (x) is assumed. Inputs from the scanning device are represented as i(x) Assume that i(x) is a fraction between 0 and 1 having 256 possible values, with each value representing one of 256 gray shades (e.g., 0 corresponding to white and 255 corresponding to black). For convenience, the gray shades can be represented by 256 integer values ranging from zero (white) to a full scale value, fs, of 255 (black). Of course, the representations of black and white are arbitrary and can be reversed. Recognizing that the marking device can only produce black and white dots, further assume that at any point x, the output of the screening device, O(x), is a 0 if the marking device is to produce a white dot at point x and O(x)=1 if the marking device is to produce a black dot at point x. If i(x) is scaled to be an integer between 0 and 255, O(x)=0 corresponds to i(x)=0 while O(x)=1 corresponds to i(x)=255. Since i(x) can have any value gray shade value between 0 and 255, it is necessary for the screening device to determine the size and number of black and white dots required to produce the desired shade of gray read by the scanning device at i(x).

The number and size of black and white dots for a given gray shade can be determined, according to the invention, from a recursive relation that considers the effect of the previous output and a secondary error, which itself is a function of the previous error and the current input. Assume that fs represents full scale as discussed above and that e(x) represents an error between inputs i(x) and outputs O(x). In order to obtain a shade of gray at the output that is equal to the shade at the input, it is desired that the average of the differences between the inputs i(x) and outputs O(x), the error, approach zero. Since i(x) can be any integer between zero and 255 while O(x) can take on only the discrete values zero and one, mathematical realtionships between i(x) and O(x) must include a scaling for O(x). Thus, on average, the difference between i(x) and the product of O(x) and fs representing full scale must approach zero to achieve the desired effect.

Assume e(x) defines an error and e'(x) defines a secondary error as:

$$e(x) = e'(x) - fs * O(x)$$

$$e'(x) = e(x-1) + i(x)$$

Then, for example, if x=3, $$\begin{aligned} e(3) &= e'(3) - fs * O(3) \\ &= e(3-1) + i(3) - fs * O(3) \\ &= e(2) + i(3) - fs * O(3) \end{aligned}$$

where $$\begin{aligned} e(2) &= e'(2) - fs * O(2) \\ &= e(2-1) + i(2) - fs * O(2) \\ &= e(1) + i(2) - fs * O(2) \end{aligned}$$

Therefore,
$$e(3) = e(1) + i(2) - fs * O(2) + i(3) - fs * O(3)$$
where $$\begin{aligned} e(1) &= e'(1) - fs * O(1) \\ &= e(1-1) + i(1) - fs * O(1) \\ &= e(0) + i(1) - fs * O(1) \end{aligned}$$

Therefore,
$$e(3) = e(0) + i(1) - fs * O(1) + i(2) - fs * O(2) + i(3) - fs * O(3)$$
where $$\begin{aligned} e(0) &= e'(0) - fs * O(0) \\ &= e(0-1) + i(0) - fs * O(0) \end{aligned}$$

assuming e(−1) = 0, then
$$e(0) = i(0) - fs * O(0)$$
Therefore,
$$e(3) = i(0) - fs * O(0) + i(1) - fs * O(1) + i(2) - fs * O(2) + i(3) - fs * O(3)$$
Thus, $$e(3) = \sum_{j=0}^{3} i(j) - fs * O(j)$$

and generally, $$e(x) = \sum_{j=0}^{x} i(j) - fs * O(j)$$

Now define the output from the screening device O(x) as follows:

$$\begin{aligned} O(x) &= 1 \text{ if } e'(x) + h * O(x-1) > = 0 \\ &= 0 \text{ if } e'(x) + h * O(x-1) < 0 \end{aligned}$$

where h is a hysteresis constant which defines allowable excursion of the error around zero.

Thus, as defined above, O(x) is a function of the secondary error e'(x) and the previous output, O(x−1). The secondary error e'(x) is a function of the previous error e(x−1) and the input i(x). As demonstrated above, the previous error is a functon of the sums and differences between the inputs i(x) and the outputs O(x). As the summation equation above shows, if e(x) is maintained in the general range of zero, the output O(x) approximates the input i(x). The hysteresis constant defines an allowable excursion of the error around zero and thus represents the difference between the output and the input. Over an arbitrarily large number of points the average error, which is e(x) divided by the number of points, approximates zero. Thus, the output gray shade would be approximately equal to the input gray shade.

Figure 2:
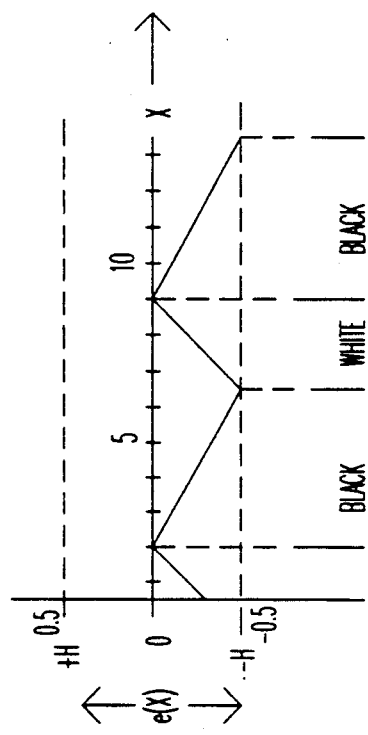
FIG. 2 shows a curve similar to that of FIG. 1 with a larger value hysteresis constant.

The effect of the hysteresis constant h is illustrated in the plots of e(x) vs. x shown in FIGS. 1-2. Assuming for simplicity a constant shade of gray input from the scanning device, all values of i(x) are equal. In FIG. 1, a first constant gray shade produces a ramp like error curve between 0 and −h. The positive slope of the ramp is i(x) and causes a single white dot to be generated for all x where e(x) is between 0 and −h. Thus, if the positive slope of the ramp spans three points in the x direction, a single white dot of size 3 is generated. When e(x) reaches zero, the inequality in the equation for O(x) flips and a single black dot whose size corresponds to the number of points in the x direction spanned by the negative slope of the curve is generated. The negative slope of the ramp during black dot generation is i(x)−1. It should be noted that the slope of the ramp is a function of the shade of gray. Thus, for a constant shade of gray halfway between white and black, the positive and negative slopes would be equal. For a lighter constant shade of gray the positive slope of the ramp would decrease, causing more white pixel output. It will be understood by those of ordinary skill that the above directions and slopes are arbitrary and could be reversed within the scope of the invention.

FIG. 2 illustrates the effect of changing the hysteresis constant h. FIG. 2 shows that, for the same constant gray shade assumed in FIG. 1, an increase in the value of h causes an increase in the size of the white and black dots produced. This is because as h increases it requires a further traversal of the x axis to go up and down the ramp. Thus, fewer transitions from black to white dots occur and the screened image produced is more coarse.

Figure 3:
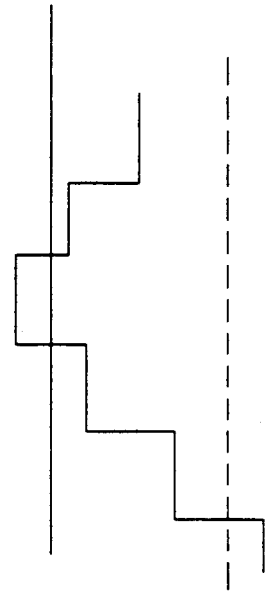
FIG. 3 illustrates the quantization effect of measuring discrete points.

While FIGS. 1 and 2 show a continuous curve, FIG. 3 more accurately illustrates the case of discrete steps as points x are individually read and processed. The quantization is a function of the scanning and does not change the principles of the invention as described above.

Figure 4:
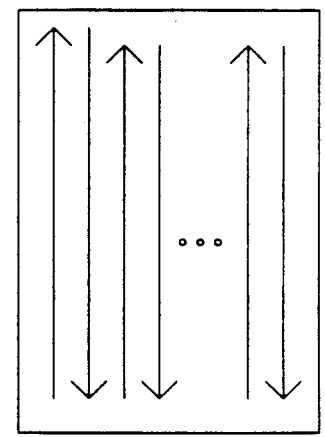
FIG. 4 illustrates scanning according to a serpentine raster procedure.

The invention thus far has been described in a single dimension for purposes of simplifying its illustration. In expanding to a typical two dimensional halftone, the scanning procedure and the distribution of the error must be addressed. One scanning approach is the serpentine raster shown in FIG. 4. Here, scanning of points (or pixels) in the x or horizontal direction takes place first from left to right followed by right to left scanning on the next line down in the y or vertical direction in the frame. Thus, the scanning from the right and left directions alternates between the lines in the vertical direction.

One approach to distributing the error is to allocate half the error in each scanning direction. Thus, for each two dimensional point (x,y) scanned, the point immediately preceding it in the x direction (x−d, where d=+1 or −1 depending on the present left to right or right to left direction of the scan) and the point immediately above it (x, y−1) each are allowed to contribute one half of the error.

Accordingly, in the two dimensional case, the following recurrence relations apply:

$$e'(x, y) = (e(x - d, y) + e(x, y - 1))/2 + i(x, y)$$

$$o(x, y) = 1 \text{ if } (e(x - d, y) + h * (o(x - d, y) + o(x, y - 1))) >= 0)$$
$$= 0 \text{ otherwise}$$

$$e(x, y) = e'(x, y) - fs * o(x, y)$$
$$d = -1^y = 1 - 2 * (y \bmod 2)$$

where x refers to points or pixels in a scan line, y refers to the scan lines, i(x, y) and o(x, y) are the input and output arrays, respectively, fs is the full scale input value, typically 255 in the case of an eight bit array, and h is an adjustable coarseness value typically of value 0.5 times the value of fs and where larger values of h result in a coarser screen.

It will be appreciated by those of ordinary skill that numerous scanning methods and error distributions are possible and that corresponding equations can be developed for these scanning and error distrbution methods which fall within the scope of the invention herein. In addition, several approaches to implementing the screening method according to the invention are possible. These include electronic circuits specifically designed to carry out the method of the invention and software programs which can be stored and executed on special and general purpose computing devices.

Figure 5:
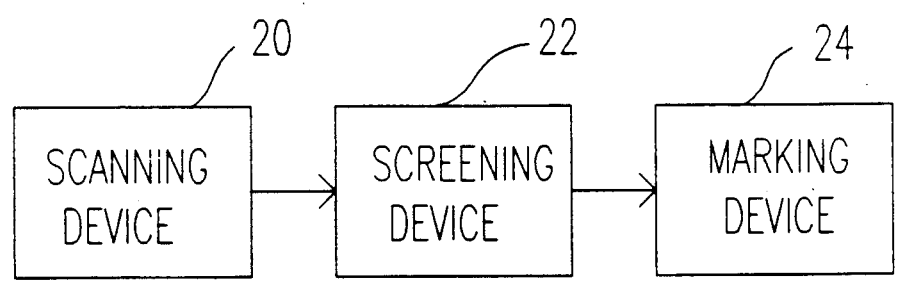
FIG. 5 is a block diagram of a preferred embodiment of the photographic image reproduction system.

FIG. 5 is a block diagram of a preferred embodiment of an image reproduction device, e.g., a photographic image reproduction device, employing the method according to the invention. The photographic reproduction device includes scanning device 20 to measure gray shades of points of an image, convert these measurements to digital form (e.g., 8 bit digital words representing intergers from zero to 255) and transmit them to screening device 22. Screening device 22 processes these data, and generates a screen pattern having only two output possible signals, one corresponding to black, and one to white. As previously mentioned, these signals could correspond to marking and not marking a medium for black and white, respectively. In addition, any marking color could be employed. Any of these embodiments are within the scope of the invention described herein. These signals from the screening device are transmitted to marking device 24, which marks a medium such as a piece of paper or photographic film accordingly. It should be noted that, for convenience, in the implementations described below the screening device reads sequences of all the points or pixels on one line of the image, then computes the required errors and outputs and generates the corresponding signals to the marking device before moving on to the next line of the image. Thus, in the flow diagram of FIG. 8 and 8A, the equations show only one subscript x, defining points of the array. The second subscript, y, used in the preceding equations to describe the two dimensional case is accounted for by the line to line scanning. For example, e(x) in the flowchart refers to storing error values for only one line, y, of the array e(x,y) at a time.

Figure 6:
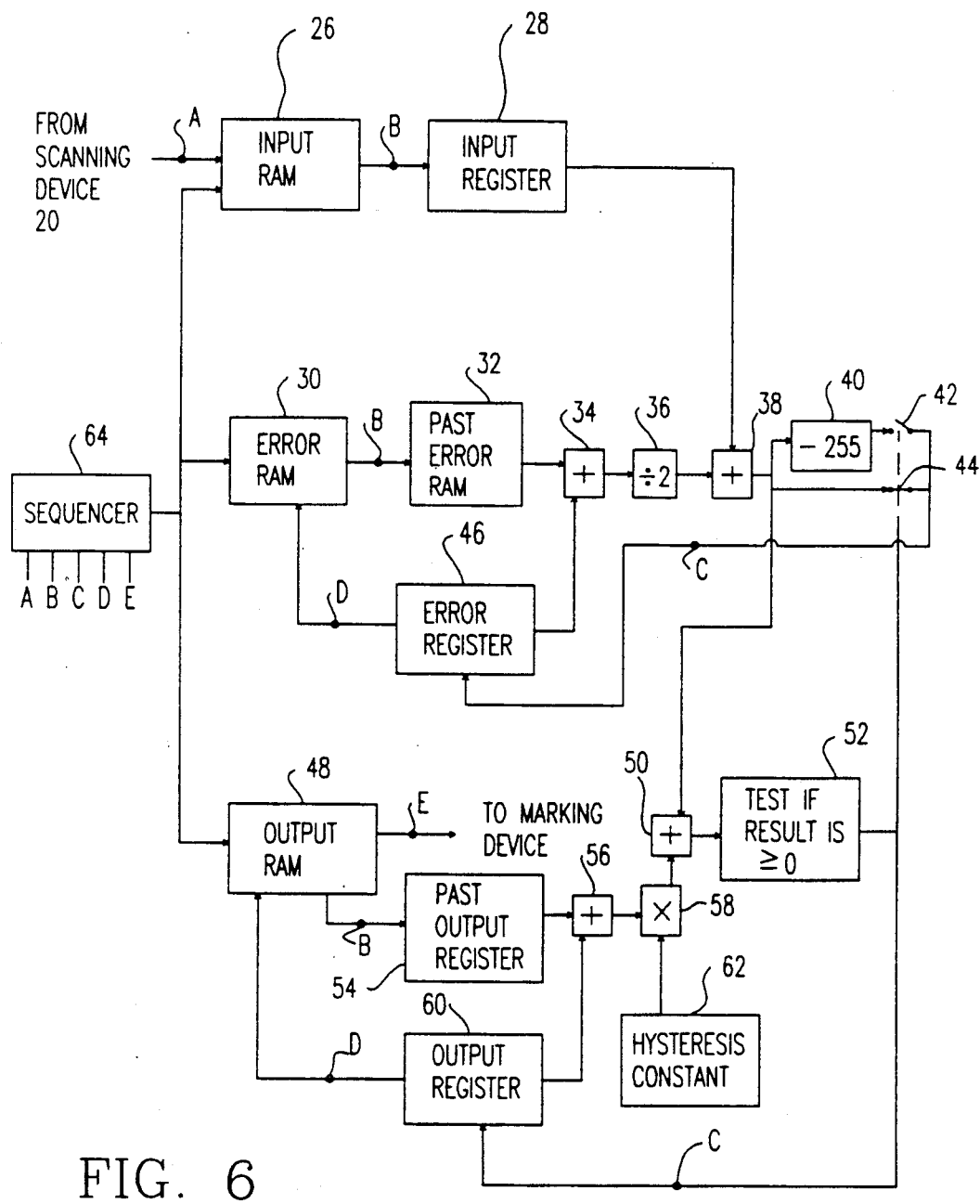
FIG. 6 is a block diagram of the screening device.

FIG. 6 illustrates an implementation of a screening device according to the invention in special purpose electronic circuitry. The circuitry includes an input register 28, an error register 46, a past error register 32, an output register 60, and a past output register 54. During the screening processing phase, for each pixel or picture element in the image, the screening processing device carries out the following sequence of operations:

(1) The contents of the error RAM 30, corresponding to the present pixel are read into the past error register 32.

(2) The contents of the output RAM 48, corresponding to the present pixel are read into the past output register 54.

(3) The contents of the input RAM 26 corresponding to the present pixel are read into the input register 28.

(4) The contents of the error register 46 and past error register 32 are added together, as in adder 34, divided by two, for example by shifting right one bit position, as in divider 36 and then added to the contents of the input register 28.

(5) The contents of the output register 60 and past output register 54 are added together, as in adder 56, and multiplied, as shown by multiplier 58 by an adjustable coarseness value or hysteresis constant h, as shown at reference designator 62.

(6) The results of steps 4 and 5 are added together. If the result is greater than or equal to zero, then step (7a) below is performed. Otherwise, step (7b) below is performed.

(7a) The constant 1 is stored into output register 60 corresponding to the marking device marking a black dot at the location corresponding to the present pixel. In addition, a constant equal to the value of the input corresponding to black is subtracted from the result of step 4 and stored in error register 46. In a typical case, eight bits are used to represent the input value, so this constant is $2^8 - 1$, or 255.

(7b) The constant 0 is stored into the output register 60, corresponding to a white dot at the location corresponding to the present pixel. In addition, the result of step 4 is stored in error register 46.

(8) The contents of output register 60 is stored into the output RAM 48 corresponding to the present pixel.

(9) The contents of error register 46 is stored into the error RAM 30 corresponding to the present pixel.

(10) The process is repeated for the next pixel which could either be to the right or to the left of the present pixel, depending on the direction of the scan.

As described above, the hysteresis constant h affects the coarseness of the patterns formed by the screening device by influencing the size of the dot produced by the marking device. A hysteresis constant value of zero corresponds to the finest possible screen. A hysteresis constant value of one times the value of full scale fs corresponds to a coarse screen. A typical value is 0.5 of full scale, fs, for a screening of medium coarseness. It should be noted however, that h can be any value which is not less than zero.

FIG. 6 shows the connections of a circuit which performs the steps outlined above. As shown in FIG. 6, the screening device 22 has a connection to the scanning device 20 that allows data values to be written to an input RAM 26. It will be known to those of ordinary skill that input RAM 26, error RAM 30 and output RAM 48, although shown as seperate elements, could be implemented as portions of a single memory device. Another connection from input RAM 26 is used to write a data value read from RAM 26 into input register 28. This activity is triggered by the B output of sequencer 64, as indicated by B on the signal line between input RAM 26 and input register 28.

Error RAM 30 has a connection to past error register 32, which is used to write a data value read from error RAM 30 into past error register 32. This activity is triggered by the B output of sequencer 64, as indicated by B on the signal line between error RAM 30 and past error register 32. An additional connection is used to store in error RAM 30 the contents of error register 46. This activity is triggered by sequencer 64 output D, as indicated by D on the connection between error RAM 30 and error register 46.

The contents of past error register 32 and the contents of error register 46 are added together by adder 34. The result of this operation is divided by two by divider 36. One example of dividing by two is shifting right by one bit position. It will be known to those of ordinary skill that other means of dividing by two are also possible and may be more convenient if, for example, computations are performed in floating point arithmetic. Such approaches are within the scope of the invention described herein. The result of this operation is further added to the contents of input register 28 by adder 38. This result is then carried to three other components, which are constant subtractor 40, switch 44 and adder 50.

Output RAM 48 has a connection to past output register 54, which is used to write a data value read from output RAM 48 into past output register 54. This activity is triggered by the B output of sequencer 64, as indicated by B on the signal line between output RAM 48 and past output register 54. An additional connection is used to store in output RAM 48 the contents of output register 60. This activity is triggered by sequencer 64 output D, as indicated by D on the connection between output RAM 30 and output register 60. A still further connection causes a data value read from output RAM 48 to be sent to the marking device. This activity is triggered by sequencer 64 output E, as indicated by E on the signal line from output RAM 48 to the marking device.

The contents of past output register 54 and the contents of output register 60 are added together by adder 56. This result is then multiplied with the adjustable coarseness value 62 by multiplier 58. The result of this multiplication is then added with the result produced by adder 50. This result is then tested for being greater than or equal to zero by tester 52. A connection allows sequencer 64 output C to store the result which is either a 1 or a 0 into output register 60.

Thus, the output register 60 now stores a 1 if the marking device is to mark a black dot at the location corresponding to the present input pixel. The constant 0 is stored into the output register 60, if a white dot is to be placed at the location corresponding to the present input pixel.

A constant subtractor 40 stores a constant equal to the value of the input corresponding to black to be subtracted from the error register. In a typical case, eight bits are used to represent the input value, so this constant is $2^8 - 1$, or 255.

The result from tester 52 is used to switch between the outputs of adder 38 and the constant subtractor 40, the result of which is simply the result of adder 38 from which the constant 255 has been subtracted. If the result from tester 52 is one, then switch 42 will be closed, and a result of constant subtractor 40, triggered by sequencer 64 output C, will be stored in error register 46.

If the result of tester 52 is zero, then switch 44 will be closed, and a result of adder 38, again triggered by sequencer 64 output C, will be stored in error register 46.

Upon signalling of sequencer 64 output D, the new output register 60 value is stored in RAM 48, and the new error register 46 value is stored in RAM 30. The entire process is now repeated for the next pixel which could either be to the right or to the left of the present pixel, depending on whether the present line is an even or odd numbered scan line.

FIG. 7 is a tabulation of the signals produced by the sequencer module. As described above, the sequencer 64 in FIG. 6 has the function of controlling the sequence of operations performed by the screening device circuitry. The sequence module generates the address signals for input RAM 26, error RAM 30, and output RAM 48. The sequencer module operates in three phases.

During the first phase, sequencer module 64 signals its output A, for each pixel in the line, while counting the address up from 0. This has the effect of causing a line of data values from scanning device 20 to be stored in input RAM 26.

During the second phase, the sequencer module will count the address from 0 to n−1, and from n−1 to 0, during alternate invocations of the second phase, where n is understood to be the number of pixels in each scan line. While counting in the second phase, the sequencer module pulses its outputs B, C, and D. Signal B has the effect of loading values from the corresponding RAMs into registers 28, 32, and 54. The loaded values are then processed by the various circuitry discussed above, in order to produce new output and error values. The new output and error values are stored in output register 60 and error register 46, respectively, upon signalling of sequencer 64 output C. Sequencer 64 output D causes the stored values to be finally stored in output RAM 48, and error RAM 30, respectively.

During the third phase, sequencer 64 counts its address from 0 to n−1, while signalling its E output once for each pixel in the line. This has the effect of transmitting the contents of output RAM 48 to marking device 24.

Figure 8:
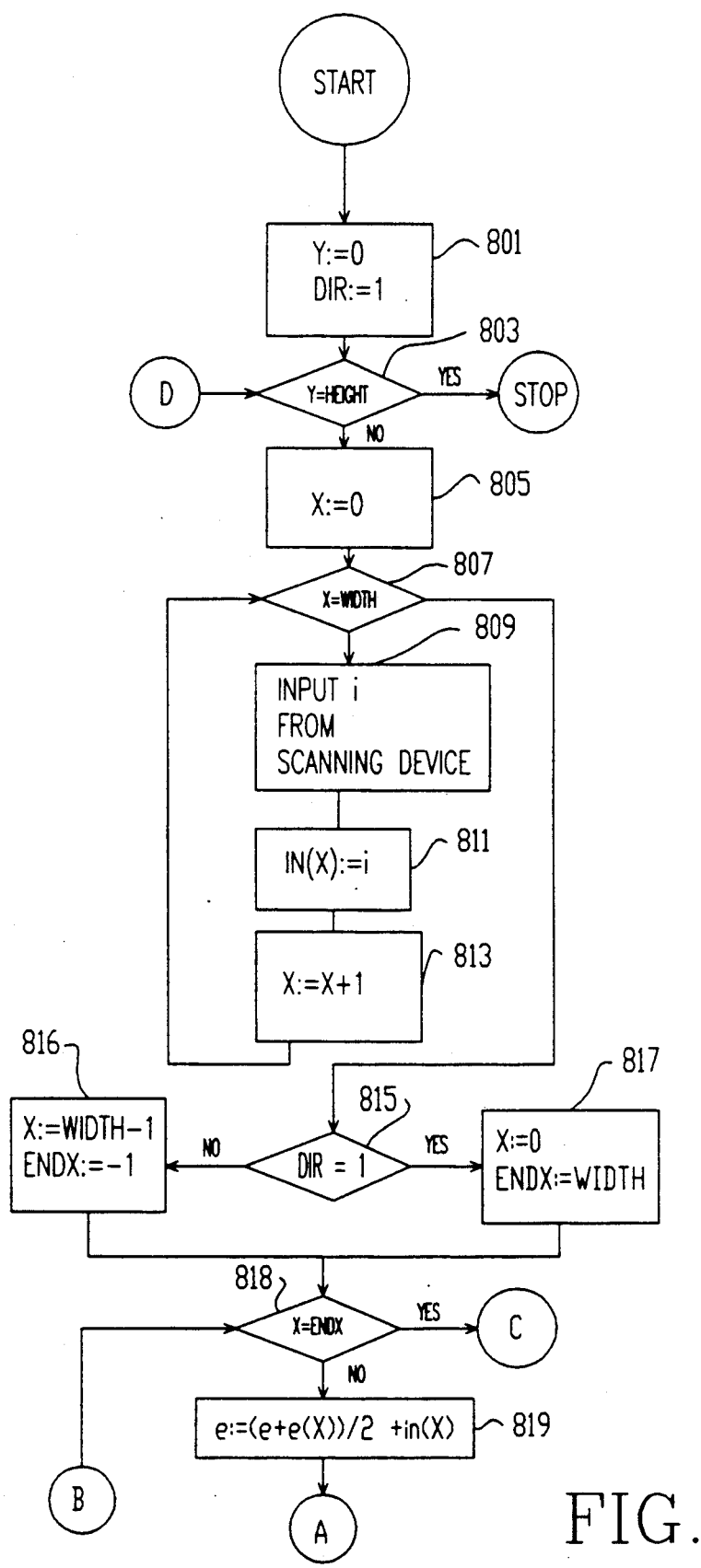
FIGS. 8–8A are a flowchart describing how a general purpose computer is programmed to carry out the functions of the screening device.
Figure 8A:
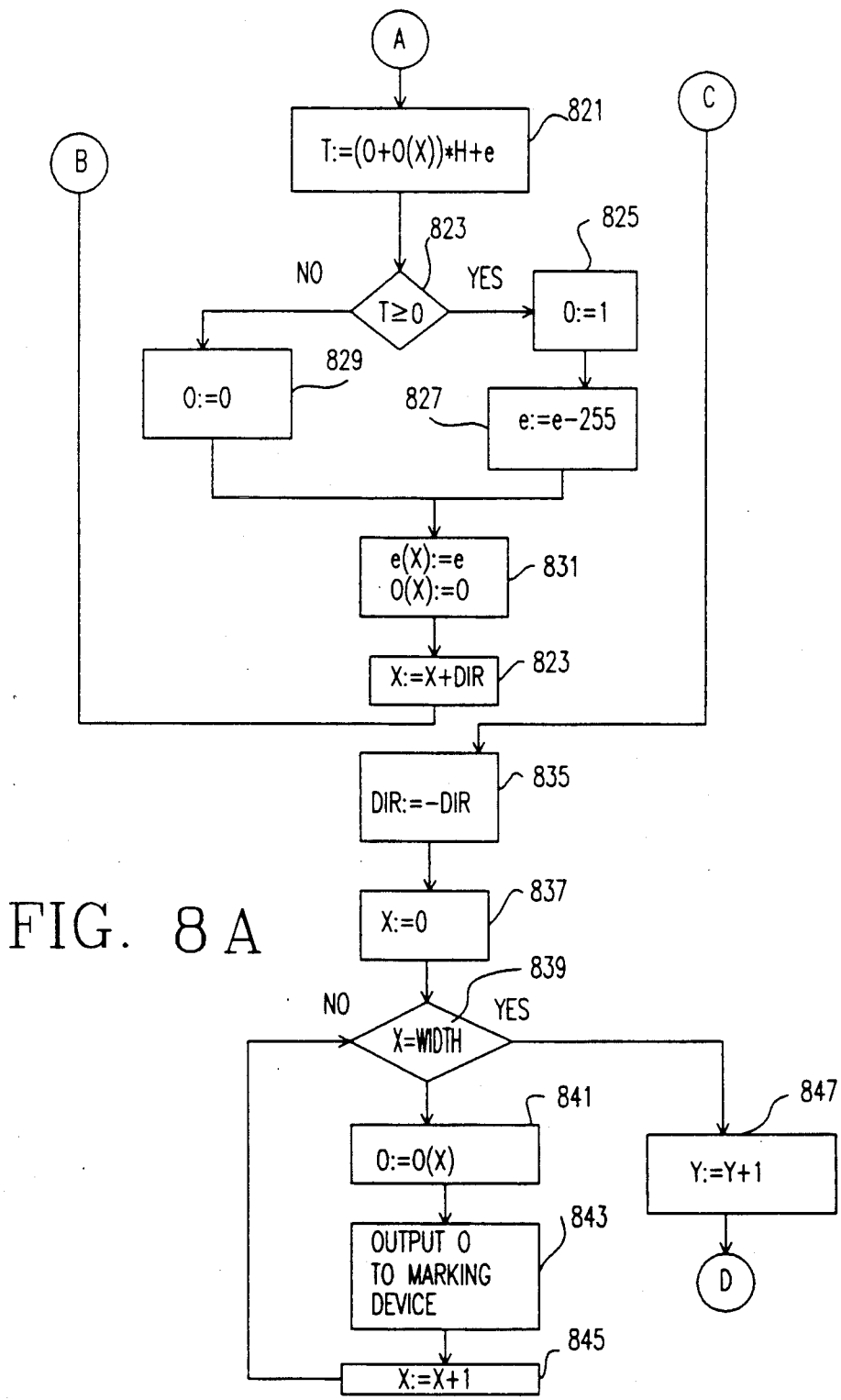

FIGS. 8-8A show a flowchart describing how a general purpose computer can be programmed to carry out the functions of the screening device. It will be obvious to those skilled in the art that the flowchart depicted in FIGS. 8-8A is a faithful simulation of the hardware depicted in FIG. 6 and FIG. 7. The flowchart can be implemented by software which can be run on a general purpose computer.

It should be noted that the flow diagram in FIGS. 8 and 8A also illustrates that an entire line is scanned by the scanning device before the screening process takes place. Thus, as previously discussed, it is not necessary in the equtions to show a second subscript, y, since this is accounted for in the implementation which operates on an entire scan line before moving on to the next line. In function block 801, the top line is designated as line zero and scanning from left to right is designated by setting variable dir equal to one. In function block 803, the current value of the line number Y is tested to determine if all the lines of the image have been processed and further processing can be stopped. If not, the horizontal variable X is set equal to zero in function block 805. In function block 807 the current value of X is tested to determine if all the points i(x) on line Y have been read. If not, in function block 809 an input is received from the scanning device and in function block 811 the measured value in(x) at point x is stored and X is incremented, as shown in block 813. These steps are repeated until the entire line has been read.

Upon completion of reading the line, screen processing begins. The direction of the scan is tested as shown in block 815. If the direction is 1, indicating the left to right portion of the scan, X is set equal to zero and a variable endX is set equal to the width of the frame. Otherwise, in block 816, X is set equal to width minus one and endX is set equal to negative one. As shown in block 817, if the end of the scan line has not been reached in this phase of the processing, as indicated by the value of X not being equal to endX, as shown in block 818, the recursive relationships previously discussed (now without needing the second subscripts) are applied in blocks 819 and 821. Function block 821 shows a temporary variable T representing an intermediate value which can be stored in a register. In function block 823, if T is greater than or equal to zero, the output O is set equal to one and the error is set equal to the error minus 255, where 255 represents full scale output, i.e., black, as shown in function blocks 825 and 827. Otherwise the output O is set equal to zero, as shown in function block 829. It will be clear to those of ordinary skill that the variable T and any corresponding temporary storage register can be eliminated by consolidating steps 821 and 823 into a single step. e(x) and o(x) are next set equal to the error and O respectively in block 831. X is incremented in block 833 and the process repeats until the line is completed.

When processing of the line is completed, processing to provide output signals for the line to the marking device can take place. Variable dir is negated, as shown in block 835. X is again set equal to zero in block 837 and tested in block 839 to determine if all the values for the scan line have been reported to the marking device. If not, O is set equal to o(x) in block 841, O is output to the marking device in block 843 and X is incremented as shown in block 845. When testing in block 839 indicates that the entire scan line has been output to the marking device, the scan line is incremented, as shown in block 847. As previously discussed, function block 803 directs processing of the next line according to the same steps until all lines are exhausted. Thus, scanning, screening and output to the marking device is completed for each scan line before the next scan line is read.

Although the invention has been described above with particularity, this was merely to teach one of ordinary skill in the art how to make and use the invention. Many modifications will fall within the scope of the invention, as that scope is defined by the following claims.

For example, the recurrence relations could be written in the C programming language, an assembly language of a particular computer, or in another language such as FORTRAN.

What is claimed is:

1. An image reproducing system, comprising:
   a) a scanning means for reading input image data corresponding to the image to be reproduced;
   b) a screening device comprising:
      memory means for storing the input image data as gray scale values for sequences of pluralities of input points, and for storing a plurality of binary output signals which direct a marking device to mark and not mark indicia on a medium;

means for generating signals allocating the marking and not marking of the indicia on the medium based on a value of a current input point in a sequence of input points, a previous output signal corresponding to a previous input point in the sequence and an error representing a difference between the previous input point and the corresponding output signals scaled relative to a maximum gray scale, the error influencing output signals for subsequent input points in the sequence; and c) a marking device to receive the output signals from the screening device, whereby the marking device marks variable size dots comprising indicia corresponding to said output signals.

2. The apparatus recited in claim 1 wherein the scanning device scans a plurality of lines corresponding to the image and the sequence corresponds to a plurality of points on at least one line.

3. A method for reproducing a photographic image comprising the steps of:

scanning a plurality of input points of an original image for reading input image data corresponding to the input pixels of the image to be reproduced;

for a present input pixel, adding an error value previously generated for a first pixel adjacent in a first scanning direction to the present input pixel with an error value generated for a second pixel adjacent to the present input pixel in a second scanning direction orthogonal to the first scanning direction and creating a first result;

dividing said first result by two and creating a second result;

adding an input data to said second result creating a third result;

adding an output value previously generated for the first pixel with an output value previously generated for the second pixel to create a fourth result;

multiplying said fourth result by a hysteresis constant to create a fifth result;

adding said fifth result to said third result to create a sixth result;

storing a seventh result of 1 if said sixth result is not less than zero and if said sixth result is less than zero storing a seventh result of 0;

multiplying said seventh result by a constant creating an eighth result;

subtracting said eighth result from said third result to create a present error value and marking indicia on an output medium in accordance with said seventh result.

4. A photographic image reproducing system comprising:

a scanning device receiving an input array i(x,y) corresponding to an original image to be reproduced, wherein x and y represent scanning directions;

a marking device receiving output signals o(x,y) from a screening device for marking indicia on an output medium in accordance with said output signals o(x,y);

the screening device using said input array i(x,y) in a recurrence relation calculation means for calculating a recurrence relation given by the following equations:

$$e'(x,y) = (e(x - d,y) + e(x,y - 1))/2 + i(x,y); \quad (a)$$

$$o(x,y) = 1 \text{ if } (e'(x,y) + h * \quad (b)$$

-continued $$(o(x - d,y) + o(x,y - 1)) > = o); = 0 \text{ otherwise}$$

$$e(x,y) = e'(x,y) - fs * o(x,y); \text{ and} \quad (c)$$

$$d = -1^y = 1 - 2 * (y \bmod 2); \quad (d)$$

wherein fs is a maximum allowable value of members of said array i(x,y), and h is a hysteresis constant, E (X, Y) defines an error function, and E'(X, Y) defines a secondary error function.

5. A photographic image reproducing system as recited in claim 4 wherein:

e(x,−1)=0;
e(−1, y)=0;
e(width,y)=0;
o(x,−1)=0;
o(−1,y)=0; and
o(width,y)=0.

6. A method of producing a halftone image comprising the steps of:

scanning a plurality of input points of an original image and generating a numerical value representing a shade of gray for each input point scanned;

outputting a screened image having a plurality of dots, each dot of said plurality of dots being one of black or white, the size of each plurality of dots being determined from a recursive relationship between a value of a current input point, a previous output, and an error representing a difference between a value of a previous input point and the previous output; and transmitting signals representing the screened image to a marking device for marking on an output medium.

7. The method recited in claim 6 wherein the recursive relationship employs a hysteresis constant, the hysteresis constant determining the coarseness of the screened image.

8. The method recited in claim 7 wherein the hysteresis constant defines an allowable excursion of the error around zero.

9. The method recited in claim 6 wherein the scanning is performed in two dimensions.

10. The method recited in claim 6 wherein the error is allocated in two dimensions.

11. The method recited in claim 10 wherein the error is allocated equally in each of the two dimensions.

12. The method recited in claim 6 wherein the recursive relationship is defined as:

$$e'(x, y) = (e(x - d, y) + e(x, y - 1))/2 + i(x, y)$$

$$o(x, y) = 1 \text{ if } (e(x - d, y) + h * (o(x - d, y) + o(x, y - 1)) > = 0)$$
$$= 0 \text{ otherwise}$$

$$e(x, y) = e'(x, y) - fs * o(x, y)$$
$$d = -1^y = 1 - 2 * (y \bmod 2)$$

where
x refers to pixels in a scan line,
y refers to the scan lines,
i(x, y) and o(x, y) are the input and output arrays, respectively, fs is the full scale input value, typically 255 in the case of an eight bit array, and h is an hysteresis constant typically of value 0.5 times the value of fs and where larger values of h result in a coarser screen, E (X, Y) defines an error function, E' (X,Y) defines a secondary error function.

13. The method in claim 12 wherein fs is a value representing a maximum gray shade and h is a product of fs and a number not less than zero.

14. The method recited in claim 6 wherein the black dots and white dots are produced by marking and not marking the medium, respectively.

15. An apparatus for producing a halftone image comprising:

means for scanning a plurality of input points of an original image and generating a numerical value representing a shade of gray for each input point scanned;

means for outputting a screened image having a plurality of dots, each dot of said plurality of dots being one of black or white, the size of each plurality of dots being determined from a recursive relationship between a value of a current input point, a previous output, and an error representing a difference between a value of a previous input point and the previous output; and means for transmitting signals representing the screened image to a marking device for marking on an output medium.

16. The apparatus recited in claim 15 wherein the recursive relationship employs a hysteresis constant, the hysteresis constant determining the coarseness of the screened image.

17. The apparatus recited in claim 16 wherein the hysteresis constant defines an allowable excursion of the error around zero.

18. The apparatus recited in claim 15 wherein the scanning is performed in two dimensions.

19. The apparatus recited in claim 15 wherein the error is allocated in two dimensions.

20. The apparatus recited in claim 19 wherein the error is allocated equally in each of the two dimensions.

21. The apparatus recited in claim 15 wherein the recursive relationship is defined as:

$$e'(x, y) = (e(x - d, y) + e(x, y - 1))/2 + i(x, y)$$

$$o(x, y) = 1 \text{ if } (e(x - d, y) + h * (o(x - d, y) + o(x, y - 1)) > = 0)$$
$$= 0 \text{ otherwise}$$

$$e(x, y) = e'(x, y) - fs * o(x, y)$$
$$d = -1^y = 1 - 2 * (y \bmod 2)$$

where x refers to pixels in a scan line, y refers to the scan lines, i(x, y) and o(x, y) are the input and output arrays, respectively, fs is the full scale input value, typically 255 in the case of an eight bit array, and h is a hysteresis constant typically of value 0.5 times the value of fs and where larger values of h result in a coarser screen, E (X,Y) defines an error function, E'' (X,Y) defines a secondary error function.

22. The apparatus recited in claim 21 wherein fs is a value representing a maximum gray shade and h is a product of fs and a number not less than zero.

23. The apparatus recited in claim 15 wherein the black and white dots correspond to marking and not marking the output medium, respectively.

24. An apparatus for reproducing a photographic image comprising:

means for scanning a plurality of input points of an original image for reading input image data corresponding to the input pixels of the image to be reproduced;

means for isolating a present input pixel and adding an error value previously generated for a first pixel adjacent in a first scanning direction to the present input pixel with an error value generated for a second pixel adjacent to the present input pixel in a second scanning direction orthogonal to the first scanning direction and creating a first result;

means for dividing said first result by two and creating a second result;

means for adding an input data to said second result creating a third result;

means for adding an output value previously generated for the first pixel with an output value previously generated for the second pixel to create a fourth result;

means for multipliying said fourth result by a hysteresis constant to create a fifth result;

means for adding said fifth result to said third result to create a sixth result;

means for storing a seventh result of 1 if said sixth result is not less than zero and if said sixth result is less than zero storing a seventh result of 0;

means for multipliying said seventh result by a constant creating an eighth result;

means for subtracting said eighth result from said third result to create a present error value and means for marking indicia on an output medium in accordance with said seventh result.

25. An image reproducing system for generating on an input medium an image corresponding to an original image, the system comprising:

a) a scanning means for reading input data of the original image to be reproduced, the scanning means generating signals representing gray scale values corresponding to each pixel of the original;

b) a screening device comprising:

memory means for storing the image data corresponding to each pixel and a plurality of output signals which direct a marking device to mark one of black or white indicia on the output medium for each output signal, each output signal corresponding to a pixel on the output medium;

means for generating signals allocating the black or white indicia on the output medium based on the gray scale value of a current gray scale scale signal, a previous output signal and an error signal representing a difference between the current gray scale signals and at least one previously generated output signal;

c) a marking device to receive the output signals from the screening device, the marking device thereby generating variable size dots comprising indicia corresponding to the output signals.

26. The apparatus recited in claim 25 wherein the black and white indicia correspond to marking and not marking of the output medium, respectively.

* * * * *